UNITED STATES PATENT OFFICE.

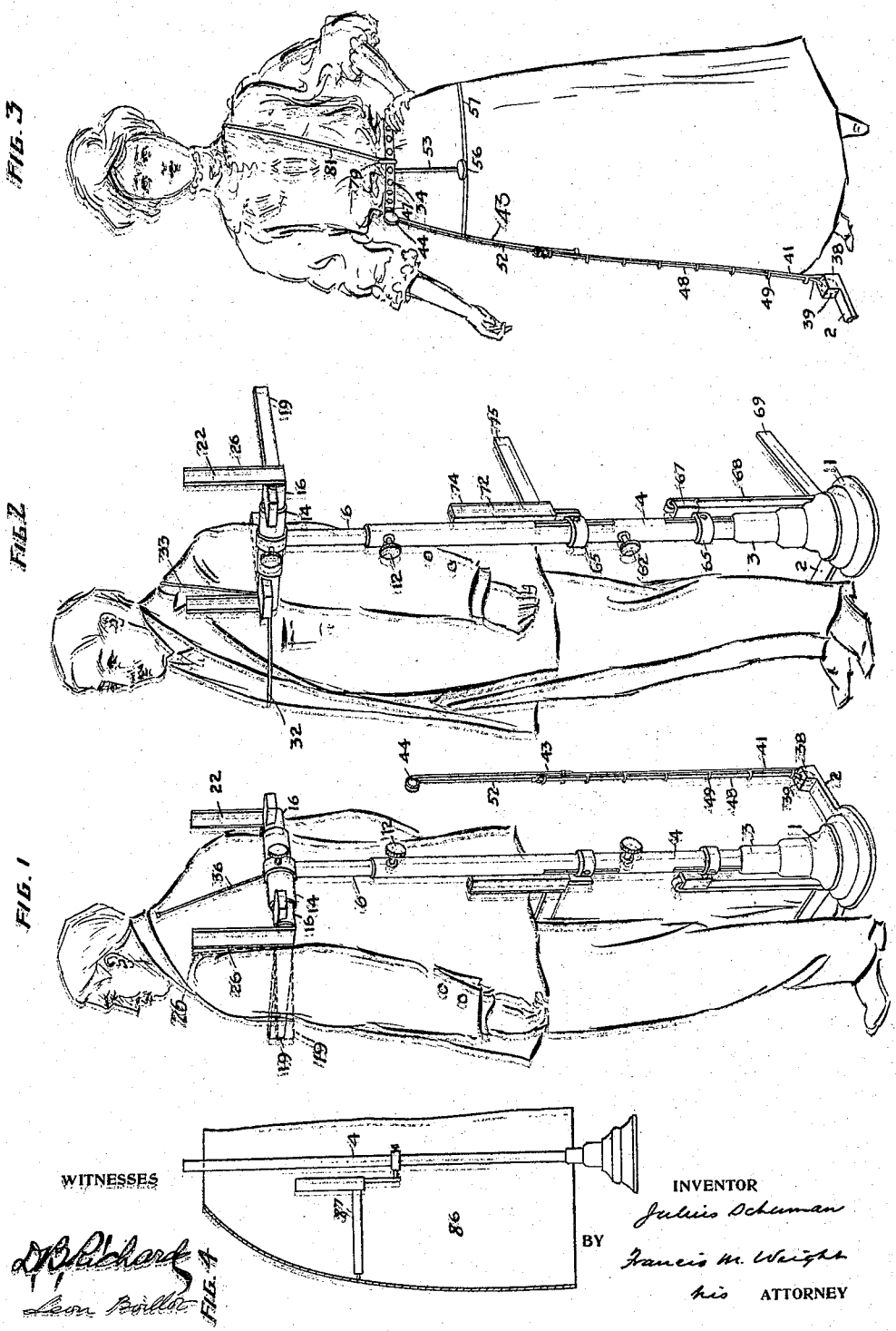

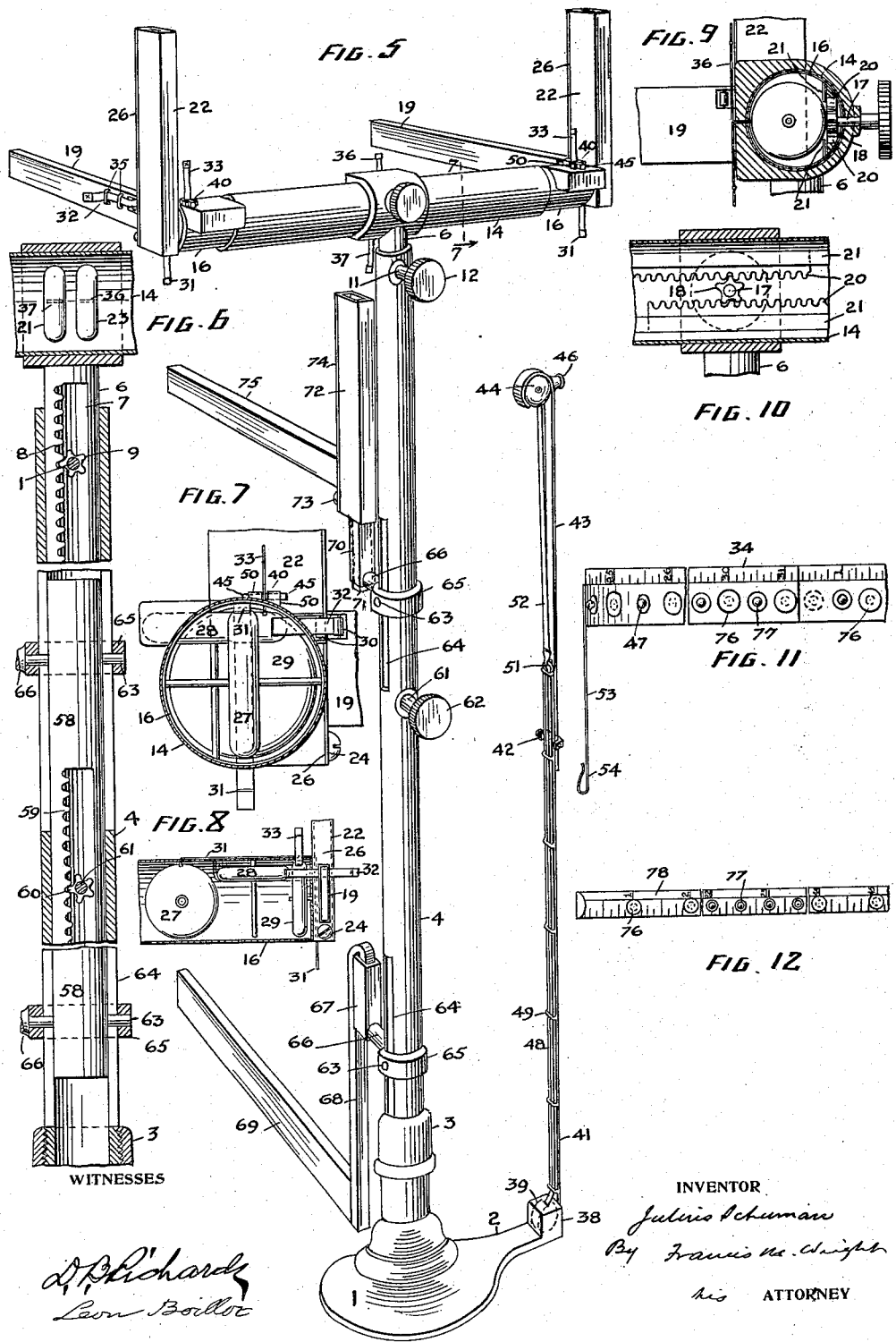

JULIUS SCHUMAN, OF SAN FRANCISCO, CALIFORNIA.

MEASURING INSTRUMENT.

1,168,431.  Specification of Letters Patent.  Patented Jan. 18, 1916.

Application filed October 31, 1912. Serial No. 728,790.

*To all whom it may concern:*

Be it known that I, JULIUS SCHUMAN, a citizen of the United States, residing at San Francisco, in the county of San Francisco and State of California, have invented new and useful Improvements in Measuring Instruments, of which the following is a specification.

It is at present the practice with tailors in measuring for both men's and women's suits to use what is called an arm square, which is a right-angled piece of wood placed under one arm of the person being measured, the vertical member of the arm square resting against the front of the shoulder, which arm square the tailor supports with one hand, while with the other he carries the ends of measuring tapes to various portions of the body for the purpose of securing measurements thereof. This instrument is inconvenient to use, on account of the fact that it requires one hand to support the arm square alone, leaving only one hand for manipulating the various tapes. Attempts have been made to adjustably support such an arm square upon a stand resting upon the ground, but no way has been heretofore devised insuring that the horizontal member of the arm square is at the proper height from the ground, a very important requirement, as otherwise the measurements will not give the correct result.

One object of the present invention is to provide means for supporting such an arm square which will allow the tailor the free use of both hands for manipulating the tapes, and also so that any deviation from the correct position of the horizontal member of the square will be at once detected.

A further object of the invention is to provide an instrument by which accurate measurements can be taken even by an inexperienced person for the purpose of making a garment.

In the accompanying drawing, Figure 1 is a perspective view showing the measuring instrument applied to the back of a person to be measured; Fig. 2 is a similar view showing said instrument applied at the side of said person; Fig. 3 is a broken front view, showing parts of the instrument as applied in measuring the length of a skirt; Fig. 4 is a sectional view showing the instrument as applied for holding a skirt form; Fig. 5 is a perspective view of the instrument; Fig. 6 is an enlarged broken vertical section taken longitudinally of a tube carrier; Fig. 7 is an enlarged broken transverse section of the same; Fig. 8 is a broken longitudinal vertical section through an end of one of the tubes; Fig. 9 is an enlarged transverse section of the tube carrier; Fig. 10 is a detail longitudinal section of the same; Fig. 11 is a broken side view of a belt; Fig. 12 is a broken side view of a tape.

Referring to the drawing, 1 indicates a base which rests on the ground and has a lateral extension 2. Supported centrally in said base 1 is a short tube 3 within which is secured a longer vertical tube 4. 6 indicates a cylindrical tube slidable vertically in the tube 4, and having a slotted portion 7, Fig. 6, one side of which is in the form of a rack 8 which is engaged by a pinion 9 on a shaft 11 having its bearing in the side of the tube 4 and turned by a small milled wheel 12. By turning said wheel 12 with the hand, the tube 6 can be raised or lowered relative to said tube 4.

To the top of said tube 6 is secured a horizontal central cylindrical tube 14, in the ends of which can slide cylindrical tubes 16, which are simultaneously moved into, or out of, the fixed tube 14 by means of a shaft 17, Fig. 10, passing through the outer tube and having a pinion 18 engaging racks 20 extending from the inner tubes and guided by guide walls 21 secured to the central tube 14. The inner vertical tube 6 is raised or lowered until the horizontal telescoping tubes 16 are approximately at the level of the armpits of the person to be measured. Rigidly secured to the outer ends of the tubes 16 are vertical hollow bars 22, and secured to the lower end of each vertical bar, as shown at 24, Fig. 8, is a spring steel indicator strip 26. Horizontal hollow bars 19, are rigidly secured to lower portions of said indicating strips, and at a short distance above the screws 24, and extend accurately at right angles to said strips 26 and also to the tubes 16. The pressure of each indicator strip maintains said strip close to said bar unless downward pressure be applied to the corresponding horizontal bar to withdraw the indicating strip from the vertical bar. When the tubes 16 have been approximately adjusted to give the proper full width between the bars 19, according to the width of the body of the person to be measured, the horizontal bars are placed under the arms, and the tube 14 is adjusted to the proper height, so that the horizontal bars 19, are in contact with the under portions of the arms of the person, further adjustment, if necessary, being made of the tubes 16. Care is taken that the pressure caused by raising the vertical tube 6 and the tube 14 attached thereto is not sufficient to appreciably withdraw the indicating strips 26 from the vertical bars 22, the purpose of these indicating strips being to insure that the horizontal bars extend from the ends of the telescoping tubes 16 accurately in a horizontal direction. If said indicating strips are, by the pressure upon the horizontal bars of the arms of the person being measured, appreciably withdrawn from the vertical bars as indicated in dotted lines in Fig. 1, then it is known that said horizontal bars 19 do not extend in a horizontal direction, and the tube 6 and the tube 14 attached thereto must be lowered until said pressure is removed from the horizontal bars, so that the indicating strips move back into contact with said vertical bars 22. In this way it is known that the ends of the telescoping tubes 16, are at the exact level of the armpits of the person to be measured; and since the tubes 16 move equally into or out of the tube 14, the middle of the tube 14 is then close to the center of the back.

In each tube near its outer end are three tape cases 27, 28, 29, Figs. 7 and 8, containing tapes 31, 32, 33, the case 28 extending partly outside said tube. The tape 31 extends from the tape case 27 through a hole in the top of the tube, and then into the vertical tube 22 and then in a downwardly direction. This tape is used for measuring women's garments, and it is pulled down and attached to a belt 34 around the woman's waist to determine thereby the length of the under-arm. It is also used with both men and women for determining the length of the sleeve. The tape 32 is extended in a horizontal direction through holes in the horizontal bar, passing around rollers 30, and then through loops 35, Fig. 5, on the outside of the horizontal bar, and is used for determining the distance around the body to the middle of the back; also the entire circumference of the body; and also for determining the circumference around the highest part of the bust of a woman. The tape 33 extends through a hole in the tube 16 and is used for determining the distance to the center of the neck at the back. In addition, there are carried in the tube 14, two tape cases 21, 23, in which are extensible tapes 36, 37 (Fig. 6), of which the tape 36 is used for measuring the height of the top of the garment at the back, and the tape 37 the length to the waist, and also to the bottom of the garment.

All of the before described tapes are held in their extended position by individual stops 40, Fig. 7, each stop comprising two slide pieces 45, which slide in suitable guides 50, and clamp the tape between them.

At the end of the lateral extension 2 is formed a receptacle 38, Fig. 5, for a tape case 39, and to the wall of said receptacle is attached a lower guide section 41, to which is adjustably secured, as shown at 42, an upper guide section 43, which upper guide section carries at its upper end a tape case 44, provided with a socket 46, which can be attached to a knob 47 on the waist belt 34 of the person being measured. A tape 48 is drawn from the tape case 39 and is passed through loops 49 in the lower guide section, and its upper end is attached by a loop 51 to a tape 52 drawn from the tape case 44. The spring of the tape case 39 is more powerful than that of the tape case 44, and consequently the lower tape 49 pulls down the upper tape 52 until the loop 51 reaches the uppermost loop 49, whereupon the lower tape is arrested in its downward movement, the indicating marks on the upper tape beginning where those on the lower tape terminate. For instance, if the lower tape has indicating marks up to 31 inches, then the first indicating mark on the upper tape is that for 32 inches. Thus it is possible to determine at once the height of the waist from the ground. This device is used either for measuring the outside length of a skirt or the outside length of trousers for men.

For taking the hip measure there are secured to, and depend from, the waist belt 34 at the front, back, and sides, strips 53 having at their lower ends hooks 54, Fig. 11. To the lower end of the front strip 53 is attached a tape case 56, Fig. 3, the tape 57 of which is passed around the hips and through the hoop 54 at the bottoms of the other strips, and is brought back to the tape case 56. The length of the tape thus drawn out of the case is then ascertained. This gives the hip measure and enables this measure to be taken by the person who is being measured.

In the lower portion of the tube 4 are upper and lower slide pieces 58, Fig. 6, connected by a rack 59 operated by a pinion 60 one shaft 61 extending through the tube 4 and turned by a milled wheel 62. Pins 63 extend from said slide through slots 64 and are connected to collars 65 carrying studs 66. Secured to the forward end of the lower stud 66 is a vertical tube 67, Fig. 5, arranged to receive a hanger 68 from the lower end of which extends a horizontal arm 69. To the upper stud 66 is secured a vertical tube 70 in which is inserted a bar 71 to which is secured a vertical hollow bar 72, to which is secured, as shown at 73, a spring steel strip 74, to which is rigidly attached a horizontal arm 75. The horizontal arm 69 is adjusted so that the bottom of the arm is at the level of the top of the heel of the shoe of the person being measured, and the upper horizontal arm 75 extends into the crotch of a man who is being measured for trousers, and the distance between these arms give the inside length of the trousers. The spring strip 74 is for the purpose of insuring that the arm 75 extends accurately in a horizontal direction in a manner already explained.

86 indicates a skirt form supported by a frame 87, which can be supported on the tube 4, in the place of the bar 71. A woman who is to be measured for a skirt, by inspecting a half skirt placed upon the skirt form, is able to determine whether the bottom of the skirt is at the proper height from the ground. She can do this much more accurately than by inspecting, by means of a mirror, a skirt which she is wearing, because in the latter case she necessarily stoops somewhat to view, even by a mirror, the bottom of the skirt and thus causes the skirt to hang improperly, so that she obtains an incorrect estimate of the height of the bottom. By the present device this error is avoided.

The belt 34 is very advantageous for determining the exact waist measure. This belt is formed at short intervals with spring sockets 76, which are adapted to receive balls or knobs 77. It is now the practice for the tailor to pass a tape about the waist and to draw it tight and ask the person to be measured whether it is too tight, or not tight enough. But this does not give very correct results, because the sensation of tightness is only temporary, and is therefore not a proper indication of the degree of tightness that would be proper for permanent wear. The belt 34 avoids this inaccuracy, if a person wears this belt during the whole time that she is being measured, and therefore has sufficient time to determine whether it has been drawn to the proper degree of tightness.

78 Fig. 12 indicates a tape, which is used in conjunction with the belt 34. This tape is formed at one end with a socket which is secured to a knob or ball on one side of the belt, and the tape is then passed up the front of the body and around the back of the neck and is brought over the front of the body and secured by another socket to a knob or ball at the other side of the belt. The tape is adjusted so that it passes across the middle of the back of the neck, and thus, by means of said tape, the distance from the belt to the middle of the back of the neck can be ascertained. The tape also furnishes a starting point to measure down the back from the top to the waist.

79 indicates a tape case attached to the belt, from which a tape 81 can be carried over the shoulder to the center of the back of the neck. This gives the length of the front waist. Also it gives the length over the highest part of the bust.

I claim:—

1. In a tailor's measuring instrument, the combination of an arm square comprising a vertical member and an approximately horizontal member, the latter arranged to fit close against the arm pit of the person to be measured, and means for resiliently supporting said horizontal member on said vertical member, said means including means for indicating an excess of pressure of the arm pit on said horizontal member.

2. In a tailor's measuring instrument, the combination of a vertical member, means for adjustably supporting the same above the ground, a spring strip, the lower end of which is rigidly secured to said vertical member and a member extending in a general horizontal direction from said spring strip and rigidly secured thereto.

3. In a tailor's measuring instrument, a vertically extensible standard, a horizontal bar supported thereby and vertically adjustable in position by extension of said standard, extension members for said horizontal bar one at each end thereof and means for causing horizontal adjustment of said extensions, said means including means for causing said extensions to move inwardly and outwardly to and from each other by equal movements with relation to said horizontal bar, and an arm square carried at the outer end of each extension, said arm square comprising a vertical member, a horizontal member, and resilient means for normally holding said horizontal member up in true horizontal position, said means including means for indicating downward movement of the horizontal member due to excessive downward pressure thereon.

4. In a tailor's measuring instrument, a vertically extensible standard, a horizontal bar supported thereby and vertically adjustable in position by extension of said standard, extension members for said horizontal bar one at each end thereof and means for causing horizontal adjustment of said extensions, said means including means for causing said extensions to move inwardly and outwardly to and from each other by equal movement with relation to said horizontal bar, and an arm square carried at the outer end of each extension, said arm square comprising a vertical member, a horizontal member, and resilient means for normally holding said horizontal member up in true horizontal position, said means including a resilient strip fastened at its lower end to the vertical member and adapted to normally lie closely to said member, the horizontal member being mounted on said resilient strip somewhat above its lower end.

5. An arm square or the like, comprising a vertical member and a horizontal member, vertically adjustable means for supporting the vertical member, means for resiliently supporting said horizontal member on said vertical member and for indicating downward movement of the horizontal member from true horizontal position due to excessive downward pressure thereon.

6. An arm square or the like, comprising a vertical and a horizontal member, vertically adjustable means for supporting the vertical member, and a flat resilient strip secured at its lower end to the vertical member, the upper end of said strip adapted to normally lie closely to said vertical member, the horizontal member being carried on the strip somewhat above its lower end.

7. For a tailor's measuring instrument, the combination of a vertically extensible standard, a horizontal bar supported thereby and vertically adjustable by extension of said standard, extension members for said horizontal bar one at each end thereof, measuring tapes mounted on and extensible from the said horizontal bar and the said horizontal extensions, and an arm square carried at the outer end of each extension, said arm square comprising a vertical member and a horizontal member, and means for resiliently supporting said horizontal member on said vertical member and for indicating downward movement of the horizontal member from true horizontal position due to excessive downward pressure thereon.

8. In a tailor's measuring instrument, the combination of a vertical standard, a horizontal bar supported thereby and vertically adjustable thereon, a horizontal extension member for said bar, measuring tapes mounted on and extensible from said horizontal bar and the outer end of said extension member, and an arm square carried at the outer end of said extension member, said square comprising a vertical member and a horizontal member, and means for resiliently supporting said horizontal member on said vertical member and for indicating downward movement of the horizontal member from true horizontal position due to excessive downward pressure thereon.

In testimony whereof I have hereunto set my hand in the presence of two subscribing witnesses.

JULIUS SCHUMAN.

Witnesses:
 FRANCIS M. WRIGHT,
 D. B. RICHARDS.

Copies of this patent may be obtained for five cents each, by addressing the "Commissioner of Patents, Washington, D. C."